(12) United States Patent
Williams

(10) Patent No.: US 7,376,786 B2
(45) Date of Patent: May 20, 2008

(54) COMMAND STACK MANAGEMENT IN A DISK DRIVE

(75) Inventor: Larry Lynn Williams, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 328 days.

(21) Appl. No.: 11/069,287

(22) Filed: Feb. 28, 2005

(65) Prior Publication Data

US 2006/0195655 A1   Aug. 31, 2006

(51) Int. Cl.
*G06F 12/00* (2006.01)
(52) U.S. Cl. .................. 711/112; 711/132; 711/158
(58) Field of Classification Search ............... None
See application file for complete search history.

(56) References Cited

U.S. PATENT DOCUMENTS

| | | | |
|---|---|---|---|
| 5,659,801 A | 8/1997 | Kopsaftis | |
| 5,857,110 A * | 1/1999 | Sakakibara et al. ............ 712/2 |
| 6,253,260 B1 * | 6/2001 | Beardsley et al. ............ 710/5 |
| 6,285,999 B1 | 9/2001 | Page | |
| 6,401,155 B1 * | 6/2002 | Saville et al. ............... 710/266 |
| 6,421,779 B1 | 7/2002 | Kuroda et al. | |
| 6,799,176 B1 | 9/2004 | Page | |
| 7,155,716 B2 * | 12/2006 | Hooman et al. ............ 718/102 |
| 2002/0162075 A1 | 10/2002 | Talagala et al. | |
| 2003/0033536 A1 | 2/2003 | Pak et al. | |
| 2003/0227703 A1 | 12/2003 | Hinshaw | |
| 2004/0083384 A1 | 4/2004 | Hypponen | |
| 2004/0228533 A1 | 11/2004 | Adelmann | |
| 2004/0243745 A1 | 12/2004 | Bolt et al. | |

* cited by examiner

*Primary Examiner*—Reginald Bragdon
*Assistant Examiner*—Mehdi Namazi
(74) *Attorney, Agent, or Firm*—G. Marlin Knight

(57) ABSTRACT

An intelligent disk drive is described which includes means for prioritizing execution of command by maintaining an associated priority with each command in a pending command list and executing the highest priority commands first. The command structure according to the invention includes a field in which the host specifies the priority of the command. One embodiment uses a plurality of stacks which are used to sort the command according to priority. Another embodiment uses a list structure. In an alternative embodiment the drive has means for ensuring that designated data written to the disk is not subject to fragmentation. The disk drive embodiments described above can be implemented in an intelligent disk drive with distributed processing capability.

8 Claims, 7 Drawing Sheets

COMMAND STACK MANAGEMENT IN A DISK DRIVE

FIELD OF THE INVENTION

The invention relates to data storage devices such as disk drives and more particularly to methods and means for optimizing command execution in a data storage device.

BACKGROUND OF THE INVENTION

A disk drive can be connected to a single computer on which multiple processes are executing and can also be connected to multiple computers each with multiple processes. Thus, there are usually multiple, independent requests for data communicated to the disk drive. The requests are conventionally stored in a FIFO "stack". The disk drive then accesses the data for the request at the top of the stack, sends that data to the requestor on the communication interface, and processes the next request in the stack. In very low speed applications, this method is adequate, but as the speed of the system increases, the performance of the overall system can diminish as the requests for files begin to fill the stack. One of the deleterious effects on system performance occurs when the host is using the disk drive for memory paging. Since the RAM memory of any system is limited, it is conventional for the computer system host to use disk storage as virtual memory when needed. The "pages" from RAM are temporarily stored on the disk drive, and then retrieved as needed by the host. The available virtual RAM memory is then very large compared to the available RAM. As the demand on the system increases, such as multiple programs running simultaneously, the amount of paging increases. Because of the FIFO design of the disk drive, the requests for pages and for program data are entered into the stack and processed in turn. As a request for a page is entered into the stack, the host must wait until the other requests above it are serviced before the page request is serviced.

A second impact on system performance with virtual memory is fragmentation of the data on the disk drive. Since a page of virtual RAM is continuous data, the speed of access is better when the data is stored in contiguous blocks of memory, then the data can be retrieved as quickly as possible with a "serial read". If the page data is stored with the normal program files, the page data becomes fragmented such that access of the data is slower than would be expected is the data was contiguous.

One solution to the fragmentation problem is to store the pages in a partition where there is always sufficient space to store the data in contiguous blocks. In the Microsoft Windows operating system, the user must setup this separate partition for paging. But the need for contiguous space will vary as the number of programs running on the host varies. The system designer is then forced to allocate sufficient space for the maximum number of pages even through much of the space will never be used.

Another solution is to add another disk drive that is dedicated to the storage of virtual memory pages. But this requires space and power in the subsystem for the additional disk drive as well as the cost of maintaining another disk drive in the sytsem.

In general, some files (such as pages of virtual RAM) are more important to the overall performance of a system than others. In addition, some files may be accessed rarely, but when an access request occurs, that file should be moved to the top of the stack and serviced immediately. There is clearly a need for a more versatile stack management system than the current single stack FIFO design.

Prior art data storage devices such as disk drives have drive control systems that include means for accepting a set of commands from a host computer. The set of commands includes commands related to self-testing, calibration and power management. Each drive has programming code (microcode) in nonvolatile memory for execution by a controller, which is a special purpose processor, to enable it to perform essential functions. The microcode can be updated through the drive's communication interface as described, for example, in U.S. Pat. No. 5,659,801 to Kopsaftis. Various standard communication interfaces with both hardware components and command protocols are commonly used such as IDE, SCSI, Serial ATA, and Fibre Channel Arbitrated Loop (FC-AL).

Commercially available disk drives cannot perform any operation on the data other than those directly related to its storage such as, for example, performing error correction computations. There have been some suggestions for enhancing disk drives (HDD) by adding an application-specific component for receiving and executing application-specific instructions. Published US patent application 20030227703 by F. D. Hinshaw, describes application-specific components which can perform application-specific tasks, such as database operations, using data on the HDDs and return results to a local host or even a remote host via a network. Examples of the application-specific components include a circuit board or an integrated circuit such as an Application Specific Integrated Circuit (ASIC), Field Programmable Gate Array (FPGA), Central Processing Unit (CPU), or Digital Signal Processor (DSP). The additional component is capable of receiving application-specific instructions via a standard network connection and executing these application-specific instructions on the data contained on the disks. The application-specific component may be in the form of an add-on board which couples to the controller circuit or, alternatively, in the form of an application-specific chip which mates with a socket provided on the controller circuit.

In US patent application 20020162075 by Talagala, et al. a storage system is described which includes a storage array controller and a storage array. The storage array controller issues scrubbing operation commands to one or more of the disk drive controllers. In response, each disk drive controller that receives a scrubbing operation command reads data from within a data range from at least one of the disk drives, calculates a new checksum for the data, and compares the new checksum to a preexisting checksum for the data. If the new checksum doesn't equal the preexisting checksum, the data within the data range is determined to be erroneous.

SUMMARY OF THE INVENTION

An intelligent disk drive is described which includes means for prioritizing execution of command by maintaining an associated priority with each command in a pending command list and executing the highest priority commands first. The command structure according to the invention includes a field in which the host specifies the priority of the command. One embodiment uses a plurality of stacks which are used to sort the command according to priority. Another embodiment uses a list structure. In an alternative embodiment the drive has means for ensuring that designated data written to the disk is not subject to fragmentation. The disk drive embodiments described above can be implemented in an intelligent disk drive with distributed processing capability.

DETAILED DESCRIPTION OF THE INVENTION AND THE PREFERRED EMBODIMENTS

Figure 1:
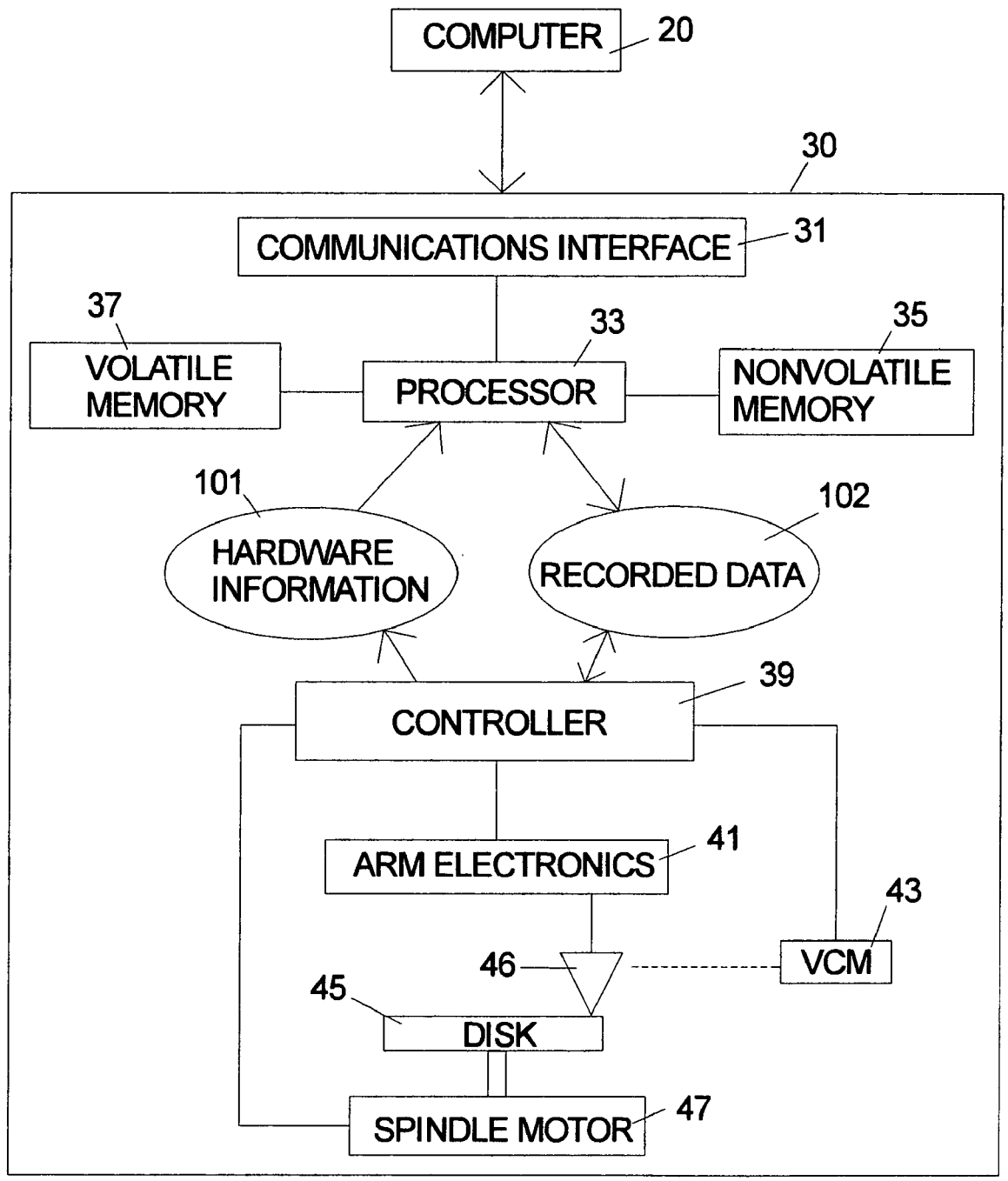
FIG. 1 is an illustration of selected components of a disk drive according to the invention.

FIG. 1 is a symbolic illustration of a disk drive 30 according to the invention which will be called an "intelligent disk drive." Information, commands, data, etc. flow back and forth between the host computer 20 and the disk drive 30 through communications interface 31 which can be any prior art hardware interface. The disk drive includes a general purpose microprocessor 33 which accesses both volatile memory 37 and nonvolatile memory 35. The program code for the microprocessor 33 can be stored in either the volatile memory 37 or nonvolatile memory 35. The program code can originate in the nonvolatile memory 35 in the form of a preprogrammed device such as an EEprom. The program code can also originate from the host computer 20. The disk drive 30 is shown as including a separate HDC controller 39, but in an alternative embodiment the microprocessor can be designed to handle all of the tasks normally performed by a controller and the controller can be omitted. The arm electronics 41, voice coil motor (VCM) 43, disk 45, spindle motor 47 and head 46 are according to the prior art. In each embodiment the microprocessor has access to the hardware information 101 which includes detailed information about the state of the components which can be used to optimize the execution of the special purpose tasks which are defined herein. The recorded data 102 is the standard data which is stored on and retrieved from the disk drive.

Distributed Task Processing

Figure 2:
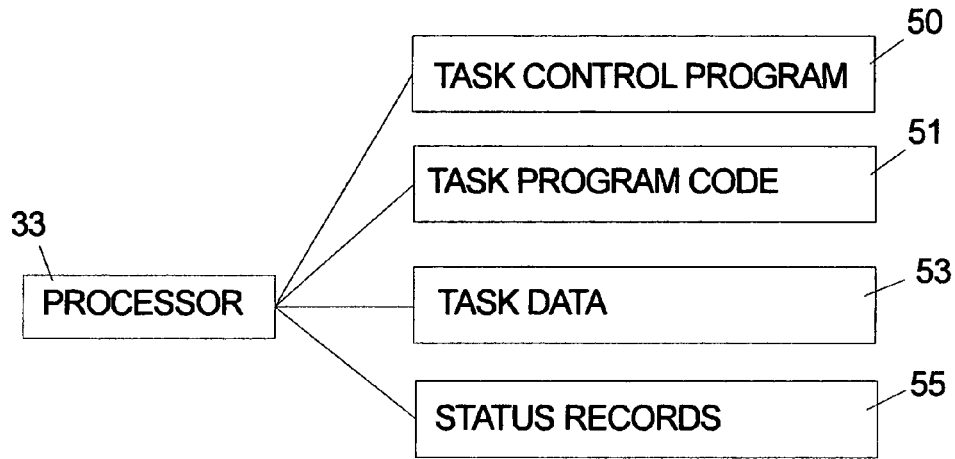
FIG. 2 is an illustration of distributed task data organization in a disk drive according to an embodiment of the invention.

The disk drive according to the invention is designed to execute distributed and/or parallel computing tasks. FIG. 2 illustrates the organization of the program and data used by the processor 33 for the task. In the embodiment described herein the disk drive has a task control program 50, task program code 51, task data 53 and status information for the distributed task 55. The task control program 50 can be loaded into memory from the disk at startup or stored in nonvolatile storage. The task control program 50 implements the basic task management functions of storing the task program, reporting results and saving progress information to allow the task to be interrupted by other drive functions. The prior art communications interfaces (IDE, SCSI, Serial ATA, Fibre Channel Arbitrated Loop (FC-AL), etc.) used between host computers and disk drives define a format through which the host can give commands and data to the disk drive. The invention can be implemented within the general framework of any of these systems with limited modifications which will described below. One modification according to the invention provides a method for the computer to send executable code and data defining a task to the disk drive for temporary or long term storage in volatile or nonvolatile memory or on the disk. Preferably the drive executes the task in the background to use otherwise free time to perform the task.

The basic command interface of the intelligent disk drive can be implemented in a variety of ways. Entirely new commands can be defined or existing commands can be modified. One particular embodiment to illustrate the invention will be described. In the prior art SCSI environment there are sufficient prior art commands to accomplish the task. However, in the preferred embodiment the intelligent disk drive must also act as an initiator rather than a simple slave. SCSI commands will be used as an example, but similar commands can be used for other interfaces such as IDE, Fiber Channel, etc. The SCSI communication link between the host and the disk drive uses a Command Descriptor Block (CDB). When the host sends a command down the SCSI BUS, each drive reads the command, but only that drive with the specific drive address. For example, the CDB a simple WRITE(6) command includes fields for:
  operation code (0Ah)
  logical unit
  logical block address
  transfer length
  control The first Byte contains the operation code, the next three bits contain the SCSI unit (disk drive), the next byte is the length of the transfer, and the final byte contains various control information. Other commands may require more or less bytes for the command, but the structure is similar to the one shown. For a disk drive, a simple subset of the commands are:
FORMAT UNIT
LOCK UNLOCK CACHE
PRE-FETCH
READ(6)
READ(10)
READ DEFECT DATA
READ LONG
REASSIGN BLOCKS
RELEASE
RESERVE
REZERO UNIT
SEARCH DATA
SEARCH DATA EQUAL
SEARCH DATA HIGH
SEARCH DATA LOW
SEEK(6) AND SEEK(10)
SET LIMITS
START STOP UNIT
SYNCHRONIZE CACHE
VERIFY
WRITE(6)
WRITE(10)

WRITE AND VERIFY
WRITE LONG
WRITE SAME
SEND DIAGNOSTIC
RECEIVE DIAGNOSTIC

In the common usage of the SCSI standard, there is one "initiator" on the BUS and one or more slave devices. The slaves do not send instructions over the BUS unless they receive a request from the host. But the recent SCSI standard allows for multiple "initiators" on the same BUS which could be more than one host or the initiator could also be in the intelligent disk drive. In the following discussion it is assumed that the various hosts and the intelligent disk drives all have the capability to send or receive commands from any host or intelligent disk drive on the BUS.

Figure 3:
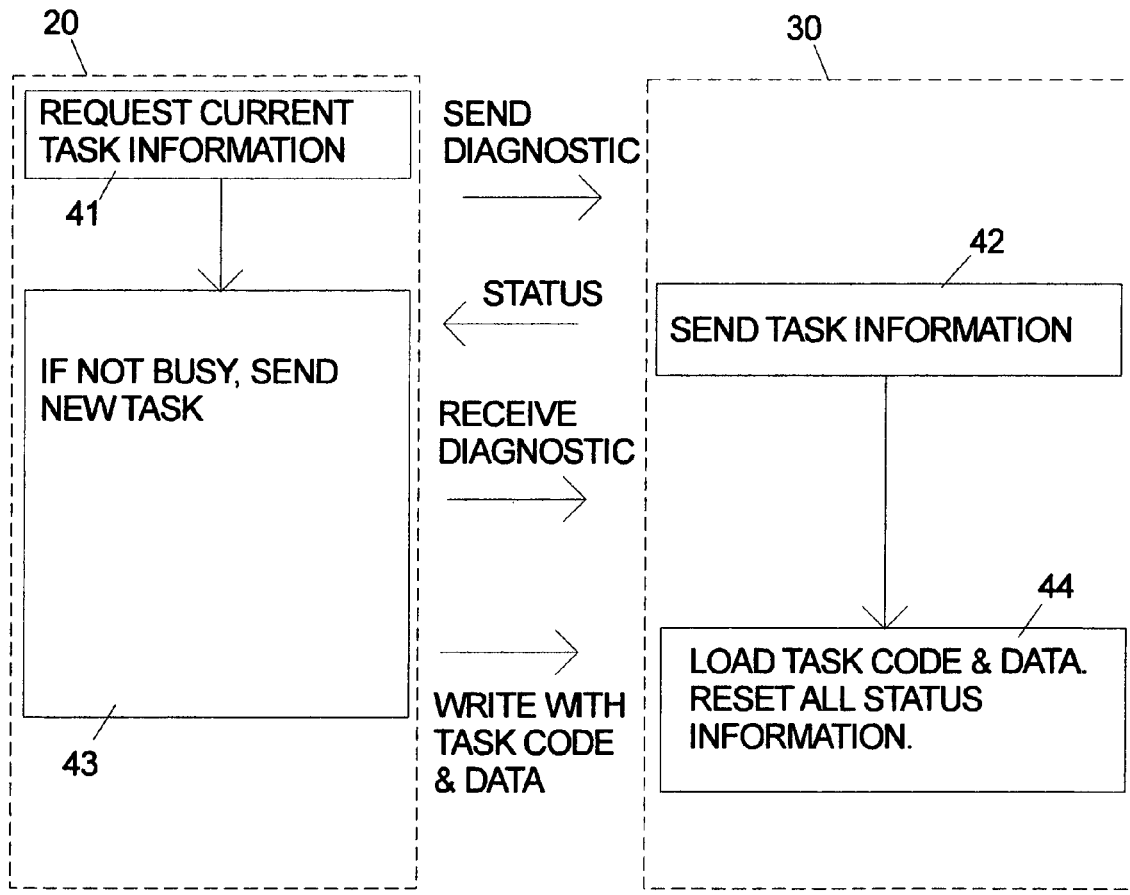
FIG. 3 is an illustration of an embodiment of the process of loading the task into a disk drive according to the invention.

The task program can conveniently be transmitted and updated through the SEND DIAGNOSTIC and RECEIVE DIAGNOSTIC commands as illustrated in FIG. 3. The host 20 can query the drive by sending a SEND DIAGNOSTIC command 41 to the disk drive. The intelligent disk drive responds by sending a block of information which includes information on the task currently defined 42. To define a new task, the host sends the intelligent disk drive a RECEIVE DIAGNOSTIC command to signal the drive to expect the task definition and then follows with a WRITE command that contains the definition of the task. The task definition can include the executable code for the task and the identity of the data. The executable code and data can be literally included in the data area of the write CDB or pointers can be used to specify data and code stored on the disk. The drive stores the task definition in the WRITE command as the new task program and initializes all of the status flags, pointers, etc. to indicate the starting point 44. In the case of multiple hosts, the intelligent disk drive optionally can accept task from only authorized hosts.

Once a distributed task is defined for the drive, the execution of the task proceeds according to the prior art multitasking computing techniques. The distributed task becomes one of potentially many things that the drive has to do. As known prior art, tasks are assigned a priority level to allocate the CPU resources. Preferably the distributed task is assigned a low priority so that it runs in the background without interfering with the standard disk drive functions.

Figure 4:
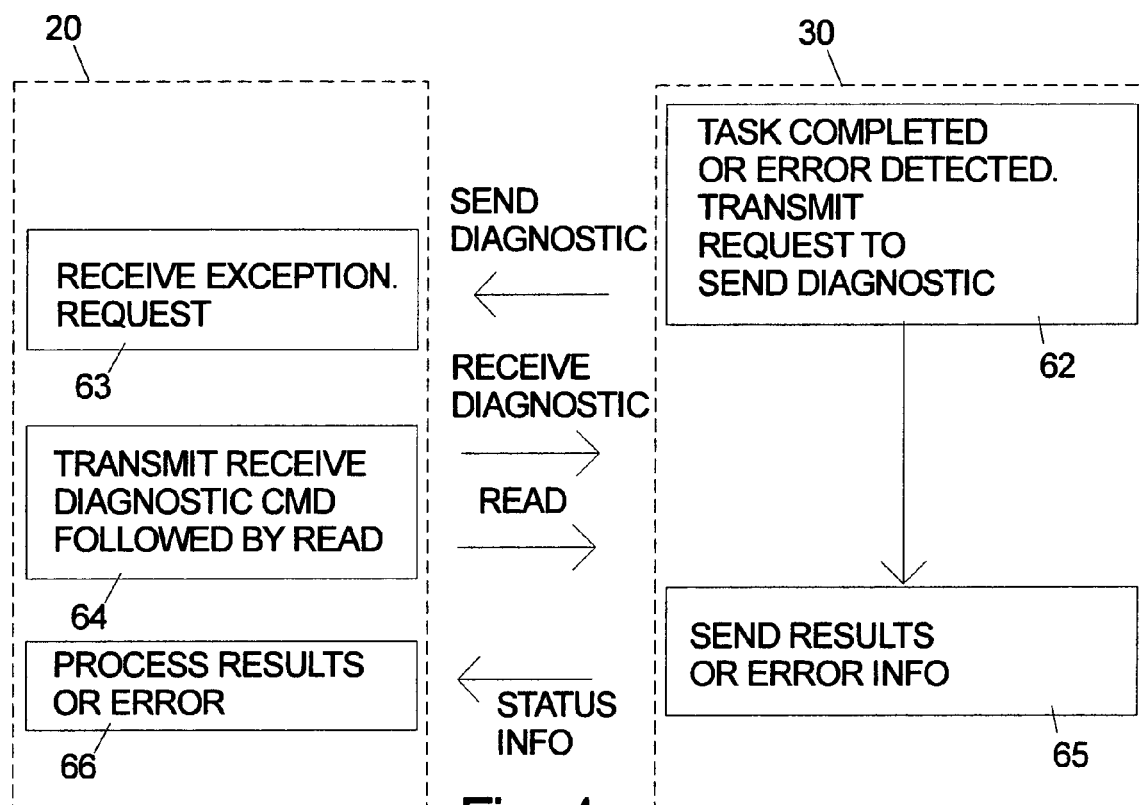
FIG. 4 is an illustration of an embodiment of the process of reporting task results from a disk drive to a host computer according to the invention.
Figure 5:
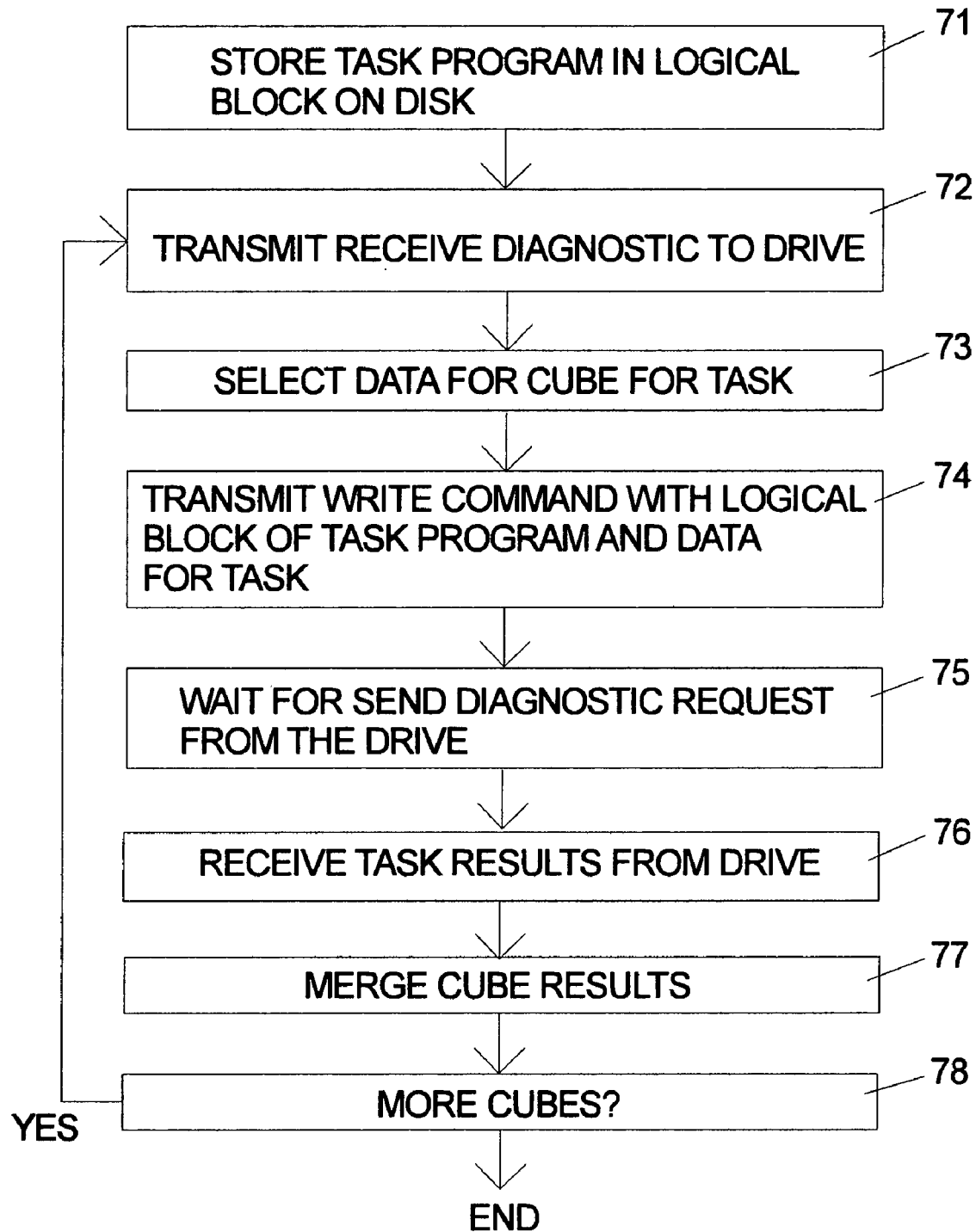
FIG. 5 is a flowchart illustrating the steps performed by a host to manage the task in the intelligent disk drive.

When the disk drive needs to communicate information about the task to the host, the drive initiates a communication sequence by signaling the host (or hosts). The communication about the task could be an error message or a completion message. In one embodiment illustrated in FIG. 4 this is done by transmitting a SEND DIAGNOSTIC command 62, which is used in the prior art for error conditions, to indicate that a problem has been detected with the file the host has requested. In this embodiment the existing SEND DIAGNOSTIC protocol is modified to include means for communicating error conditions relating to the task and the results of the task. The host receives the SEND DIAGNOSTIC command as an exception 63. It continues the dialog by requesting the details by issuing a RECEIVE DIAGNOSTIC command to the intelligent disk drive followed by a READ command 64 which serves as a request for the status details and allows the drive to put relevant data in data area of the response to the read command. The intelligent disk drive interprets the sequence of commands as a command to transfer the task specific information to the host 65. Once the host has received the detailed information, it can decide upon appropriate further action such as sending a new task to the drive 66.

The communication interface is used only to communicate the results each computation to the host and optionally other processors in the array. The mass data storage, RAM memory, and task program are intimately connected such that the exact location of the required data and program instructions are known. This architecture requires fewer resources than the previous architecture because each series of instructions and set of data can be fetched immediately as required by the CPU rather than loading complete files to the CPU over the interface. For example, if a complete program, with it's associated branches requires 100 MB, but the current process only requires 1 MB of the code, only that portion of the instructions would be loaded and the remainder would remain on the mass storage until it was required. This architecture is a much faster implementation (the objective of parallel processing systems) while potentially limiting the cost. Thus a parallel processing task can be accomplished with less resources than one that has more overhead and consequently requires more processors and possible more time.

In contrast to the prior art disk drive architecture, the invention describes an architecture with a CPU and task control program inside the disk drive. Logically the CPU is positioned inside the SCSI or other interface so the hand shaking overhead necessary for communication over that interface is avoided for the actual task execution. The principal communication to the disk drive (mass storage) is only through the hard disk controller. On some applications, the hardware necessary for the CPU and the HDC may be merged.

In this implementation the CPU need only fetch the portions of the program that are currently necessary because the HDC can be programmed to keep other parts of the program available on mass storage as needed. It now has the ability to do "stream processing" in which each block of a large data stream (such as a video file) can be read, processes, and stored as the next block is being read. This architecture supports the most general parallel computing architecture described earlier, so any task that is amenable to parallel computing can be accomplished with an array of such disk drives. Even though there are several architectures for parallel computers, the architecture that contains the CPU inside the disk drive will support any one of the designs, and results in a simpler implementation that has higher speed because of the elimination of much of the overhead in a typical computer architecture. Although this architecture is advantageous in a single-instruction single-data application, it is even more advantageous in other architectures such as multiple-instruction multiple-data architectures where overhead is a significant part of the computational time.

Figure 6:
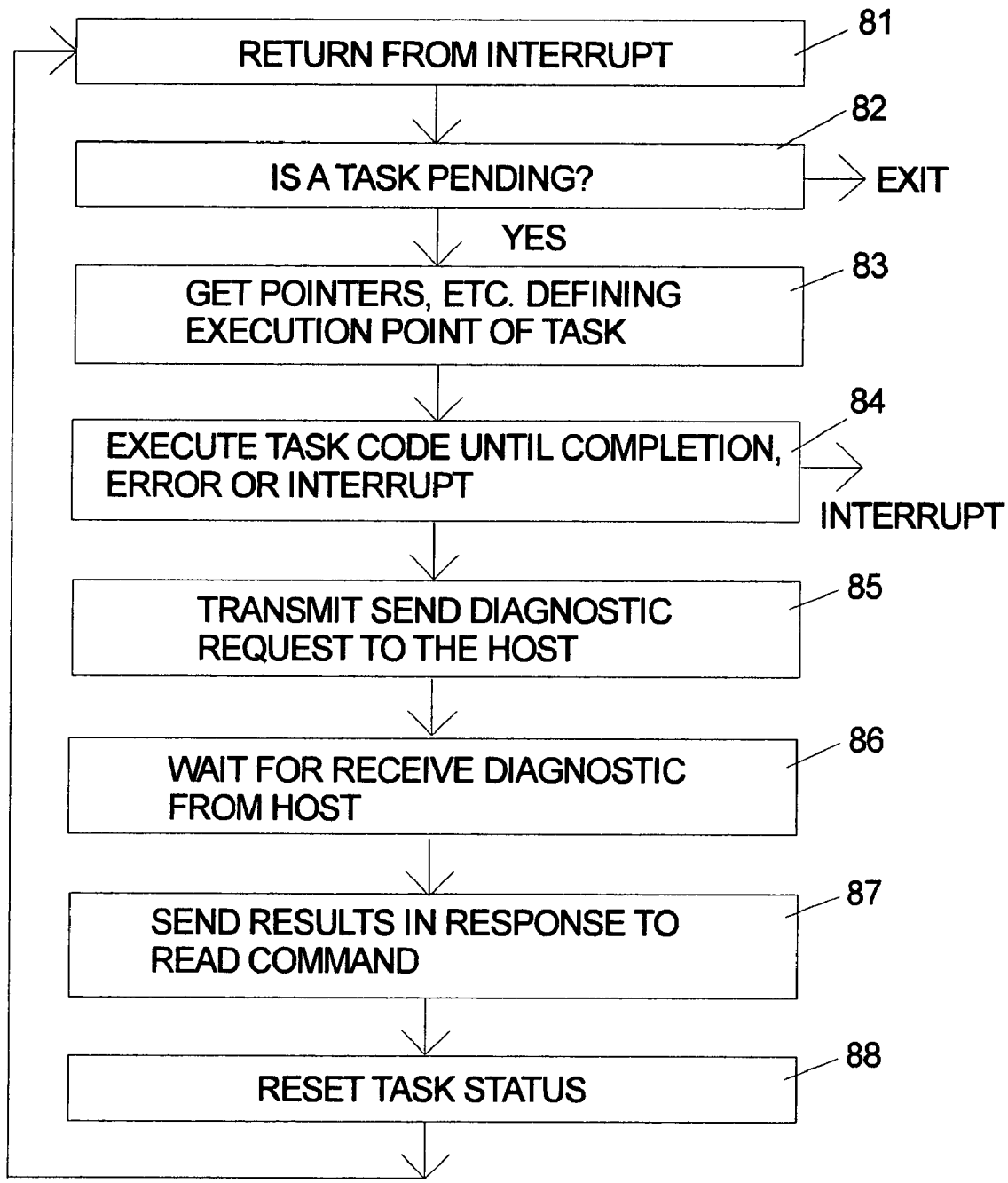
FIG. 6 is a flowchart illustrating the steps performed by an intelligent disk drive to execute a task according to the invention.

FIG. 6 is a flowchart illustrating the steps performed by an intelligent disk drive to execute a task according to the invention. The execution of various functions of the intelligent disk drive are generally interrupt driven as is the case for many systems having a plurality of real-time control and communications tasks. The definition of the task as shown in FIG. 3 is preferably interrupt driven. The execution of the distributed task is itself subject to being interrupted and upon return from an interrupt 81 the task control program preferably checks for a pending task 82. The status flags and pointers associated with the task will record whether a task is pending and sufficient information to allow the execution of the task to resume. This status information must be saved whenever a distributed task is interrupted (not shown) and it is reloaded when the task execution is resumed 83. The execution of the task continues until another interrupt occurs, an error is encountered or the task is completed 84. For an error or completion the task control program sends a SEND DIAGNOSTIC request to the host 85. The task control program waits for the host to send the RECEIVE DIAGNOSTIC command 86 and then sends the block of data for the error or completion to the host in response to the next read command 87. The task control program then resets the task status flags to indicate that no task is pending 88 and returns to normal interrupt driven processing.

The time for one rotation of the disk in current disk drives can be estimated as 4 to 10 milliseconds. Since microprocessors are available which operate on GHz clocks, times in milliseconds potentially allow time for significant processing to occur while the drive would otherwise be waiting on the mechanical components. In a preferred embodiment the execution of the task program occurs in parallel with the normal disk drive functions so that negligible delay, if any, occurs in delivering the data read from the drive.

The limitations on parallel computing system can be re-evaluated based on of the intelligent disk drive. For example, suppose there is a need to perform the computation A=B+C+D+E. In the first scenario this calculation is performed on a standard computer. The four numbers, B, C, D, and E are loaded from storage (the disk drive), the calculation is made, and the number A put back in storage. In a 15,000 RPM disk drive, the disks revolve one revolution in 4 ms., so the average latency is 2 ms. For this computation, 2 ms is need (on the average) to get B, C, D, and E (assuming there in the same logical block). This ignores the time required to move the heads over the proper track. Another 2 ms. is needed to store the data, so the net time required, assuming an infinitely fast computer is 4 ms. If this same process is performed by two computers, a simplified parallel computer array, the scenario becomes: load B and C in one computer, D and E in the second, perform two computations in each computer, send the result of the second to the first computer, add the two temporary results, and finally store the result A, the time required is still 4 ms. Having two computers has not improved the speed of the computation because of the overhead of accessing the data on the disk drives. On the other hand if this computation is performed in an intelligent disk drive, it still might require 2 ms. to get to the start of the physical block containing B, C, D, and E, but once the computation is made, the result can be stored on the next physical block, eliminating most of the second 2 milliseconds.

In a system configuration, where there are a plurality of intelligent disk drives on the same BUS the intelligent disk drive can communicate directly with other the other intelligent disk drives. Therefore, in one advanced embodiment, the means for communicating to other intelligent disk drives could be made part of the task control program or it could be included in the task code.

Command Sequence Optimization

Figure 7:
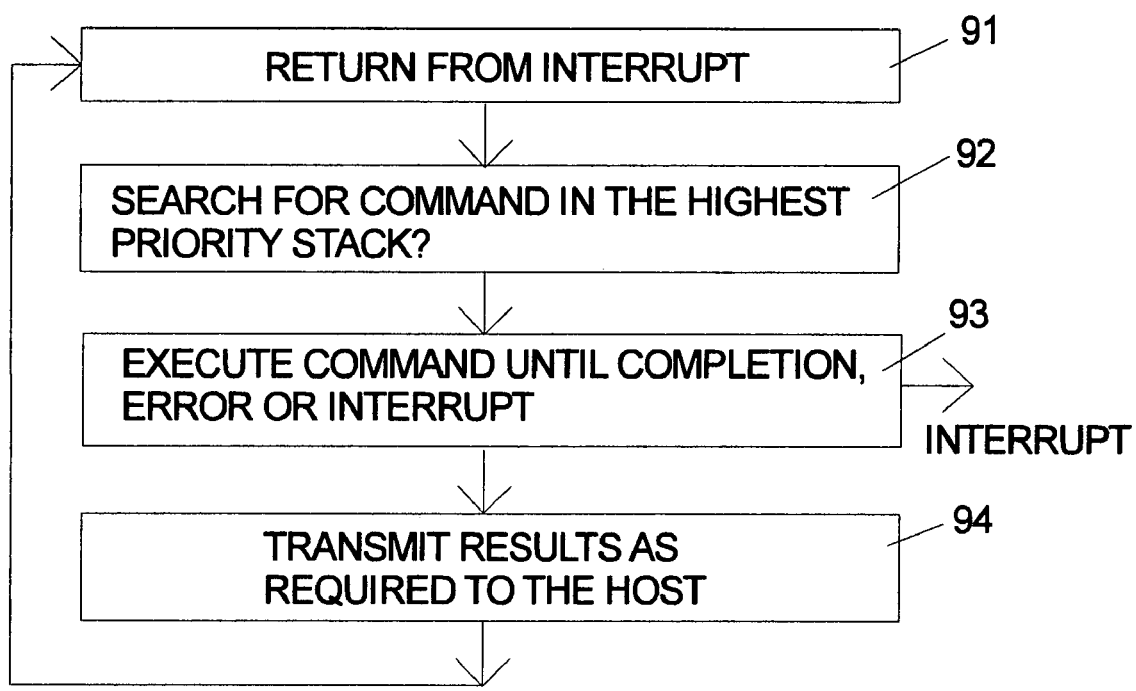
FIG. 7 is a flowchart of the steps in processing a command in a multiple stack embodiment of the invention.

In an embodiment of an intelligent disk drive proposed in this invention, the processor and associated firmware are designed to manage the stack (or stacks) relative to the importance of the commands. Conceptually, we can consider this advanced stack management implementation as several stacks, each with a different priority. The stack can be split into "n" stacks where only the highest priority requests are stored in stack A, lower priority request are stored in stack B, and so forth until the lowest priority requests are entered into stack N. In this design, requests at the highest level (stack A) are serviced first. Once stack A is empty, the disk drive starts servicing requests in stack B, and continuing until all but the last stack are empty at which time stack "n" is serviced. In some applications, only two or three stacks may be required. FIG. 7 is a flowchart illustrating the process of retrieving command from the stacks. In general, the command execution will be interrupt driven, so the starting point is shown as a return from an interrupt 91. Technically the command could received and processed without ever being interrupted. The set of command stacks are searched from the highest to the lowest priority for a command 92. The selected highest priority command is executed until completion, error or interrupt 93. The results are then transmitted as necessary to the host 94. It is also possible to maintain the commands in a single list with the associated priority. The drive can then either search the list or maintain it as ordered list.

Figure 8:
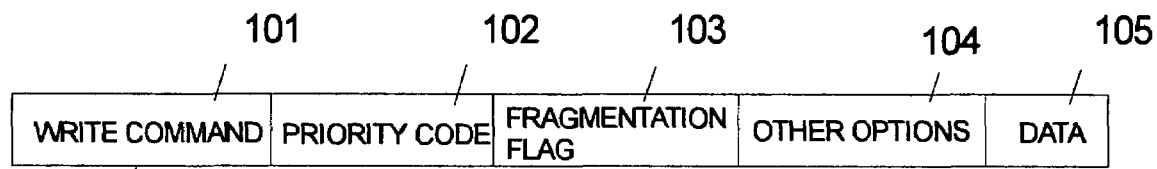
FIG. 8 is a symbolic illustration of a write command with fields used in an embodiment of the invention.

In one embodiment, the intelligent disk drive command structure is designed to include a field which is used to tell the drive the priority to associate with the command. FIG. 8 illustrates a command block 100 in which a write command 101 is associated with a priority code 102 for the data 105.

To address the fragmentation problem for high priority data, in an alternative embodiment, the intelligent disk drive command structure is designed to include a flag or field which is used to tell the drive to store the associated data in contiguous storage, that is, to not fragment the data which is being stored. The non-fragmentation command option can be implemented independently from the prioritization scheme. The command block of FIG. 8 includes a field 103 which instructs the drive whether or not it is permissible to fragment the data. When so instructed the drive will store the data in consecutive blocks to ensure an optimum readback. This would be particularly appropriate for virtual memory page storage.

In an embodiment implementing both prioritization and non-fragmentation, the host can designate virtual memory page writes for non-fragmented storage and specify a high priority when reading the virtual memory pages. This should result in an improvement of overall system performance.

Still more generally the command block can be extended to include other attribute fields 104 of the files such as compression and encryption.

The invention has been described with respect to particular embodiments, but other uses and applications for the techniques according to the invention will be apparent to those skilled in the art.

The invention claimed is:

1. A method of operating a disk drive comprising the steps of:

receiving a write command from a host computer wfth an associated priority code and a no-fragmentation field, the write command being from a set of commands that includes at least one read command for reading data from storage and one write command for writing data to storage;

storing the write command and associated priority code in a selected one of a plurality of stacks according to the priority code, so that commands with an equal priority are stored together in a designated stacK;

executing commands in order of highest priority by searching the plurality of stacks from highest priority to lowest priority to select the command having the highest priority; and executing the write command in response to the no-fragmentation field by storing data associated with the write command in a contiguous block of nonvolatile storage.

2. The method of claim 1 further comprising the steps, executed after storing the first command from the host and before the step of executing commands, of processing an interrupt and returning from processing the interrupt after executing the interrupt.

3. A method of operating a disk drive comprising the steps of:
  receiving a write command from a host computer with an associated priority code and a no-fragmentation field, the write command being from a set of commands that includes at least one read command for reading data from storage and one write command for writing data to storage;
  storing the write command and associated priority code in a list according to the priority code, so that commands with can be retrieved according to their priority;
  executing commands in order of highest priority by selecting a highest priority command in the list and executing the write command in response to the no-fragmentation field by storing data associated with the write command in contiguous blocks of nonvolatile storage.

4. The method of claim 3 further comprising the steps, executed after storing the first command from the host and before the step of executing commands, of processing an interrupt and returning from processing the interrupt after executing the interrupt.

5. A disk drive comprising:
  a processor and a memory for storing data and a program for the processor;
  means for storing commands in a plurality of stacks being designated to sort commands according to a priority assigned to each command with highest priority commands being stored together, the commands being from a set of commands that includes at least one read command for reading data from storage and one write command for writing data to storage;
  means for executing the commands according to priority by executing the highest priority command in the plurality of stacks prior to executing any commands having lower priority;
  means for receiving a no-fragmentation field from the host computer associated with The write command; and
  means for executing the write command so that data associated with the write command is stored in a contiguous block of nonvolatile storage.

6. The disk drive of claim 5 further comprising means processing an interrupt and returning control to the means for executing the commands.

7. A disk drive comprising:
  a processor and a memory for storing data and a program for the processor;
  means for storing commands in a list according to a priority assigned to each command, the commands being from a set of commands that includes at least one read command for reading data from storage and one write command for writing data to storage;
  means for executing the commands according to priority by executing the highest priority command in the list prior to executing any commands having lower priority;
  means for receiving a no-fragmentation field from the host computer associated with the write command; and
  means for executing the write command so that data associated with the write command is stored in a contiguous block of nonvolatile storage.

8. The disk drive of claim 7 further comprising means processing an interrupt and returning control to the means for executing the commands.

* * * * *